United States Patent [19]

Kubota

[11] Patent Number: 4,751,573
[45] Date of Patent: Jun. 14, 1988

[54] STANDARD CONVERTING APPARATUS

[75] Inventor: Tatsuya Kubota, Kanagawa, Japan

[73] Assignee: Sony Corporation, Tokyo, Japan

[21] Appl. No.: 7,192

[22] Filed: Jan. 27, 1987

[30] Foreign Application Priority Data

Feb. 19, 1986 [JP] Japan .................................. 60-34286

[51] Int. Cl.⁴ ............................................. H04N 7/01
[52] U.S. Cl. ..................................... 358/140; 358/160
[58] Field of Search ........................... 358/140, 11, 160

[56] References Cited

U.S. PATENT DOCUMENTS 4,449,143  5/1984  Dischert ............................... 358/140
4,605,950  8/1986  Goldberg .............................. 358/11
4,622,577  11/1986 Reitmeier ............................. 358/140

Primary Examiner—Howard W. Britton
Attorney, Agent, or Firm—Lewis H. Eslinger; Alvin Sinderbrand

[57] ABSTRACT

In a standard converting apparatus for converting a television signal of the high definition television standard, for example, into that of the NTSC standard, data of an odd field and an even field of the NTSC standard are developed from data of one field of the high definition television standard and stored into memories. The stored data of the odd and even fields are consecutively read out to effect the reproduction of a still picture or slow reproduction. Because the reproduction of the still picture and the slow reproduction are achieved using one frame data of the odd field and even field, the picture becomes distinct. Also, since the odd and even fields are developed from the data of one field, double images are not reproduced even if picture movement occurs.

7 Claims, 6 Drawing Sheets

STANDARD CONVERTING APPARATUS

BACKGROUND OF THE INVENTION

1. Field of the Invention

The invention relates to a standard converting apparatus and, more particularly, to an apparatus for converting a television signal according to one standard, such as, the high definition television standard in which each field has a large number of lines into a television signal according to another standard, such as the NTSC standard in which each field has fewer lines.

2. Description of the Prior Art

A high definition television (referred to hereunder simply as "HD") standard having 1125 lines and capable of the reproduction of a high resolution picture has been proposed.

It has been desired to add the functions of reproducing a still picture of a desired scene and of slow reproduction to a standard converting apparatus for converting a television signal of the HD standard into that of the NTSC standard, and thereby make possible reproduction of a still picture as well as slow reproduction using a monitor of the NTSC standard with respect to a television signal sent in the HD standard.

In order to perform the reproduction of a still picture and slow reproduction, it has been proposed that data of one frame of a television signal be stored in a frame memory to permit the identical data to be read consecutively and at slower speed. However, since one frame of the television signal is made up of an odd field and an even field, double images are reproduced in a moving picture when a still picture is reproduced from one stored frame of data.

Therefore, in order to execute the reproduction of a still picture and slow reproduction in accordance with the prior art, one field of a television signal is stored in a field memory, and a picture of one frame is developed using data of the one field, and the identical data are read out consecutively.

If one frame picture is developed using one field data as mentioned above, there is a problem that a distinct picture cannot be obtained because only the data of one field are employed.

OBJECT AND SUMMARY OF THE INVENTION

An object of the invention is, therefore, to provide a standard converting apparatus capable of the reproduction of a distinct still picture as well as of slow reproduction.

According to one aspect of the invention, there is provided a standard converting apparatus for converting a video signal according to a first television standard into a video signal according to a second television standard, and which comprises: a first line number converter for developing a picture of an odd field in said second television standard from one field in said first television standard; a second line number converter for developing a picture of an even field in said second television standard from said one field in said first television standard; a first memory for storing said data of the odd field in said second television standard, which have been developed at said first line number converter; and a second memory for storing said data of the even field in said second television standard, which have been developed at said second line number converter, whereby data output from said first memory and said second memory are taken out as data in said second television standard.

The above and other objects, features and advantages of the present invention will be apparent from the following detailed description of a preferred embodiment thereof when taken in conjunction with the accompanying drawings.

BRIEF DESCRIPTION OF THE DRAWINGS

In the drawings, identical reference numerals denote identical structural elements.

DETAILED DESCRIPTION OF THE PREFERRED EMBODIMENT

Figure 1:
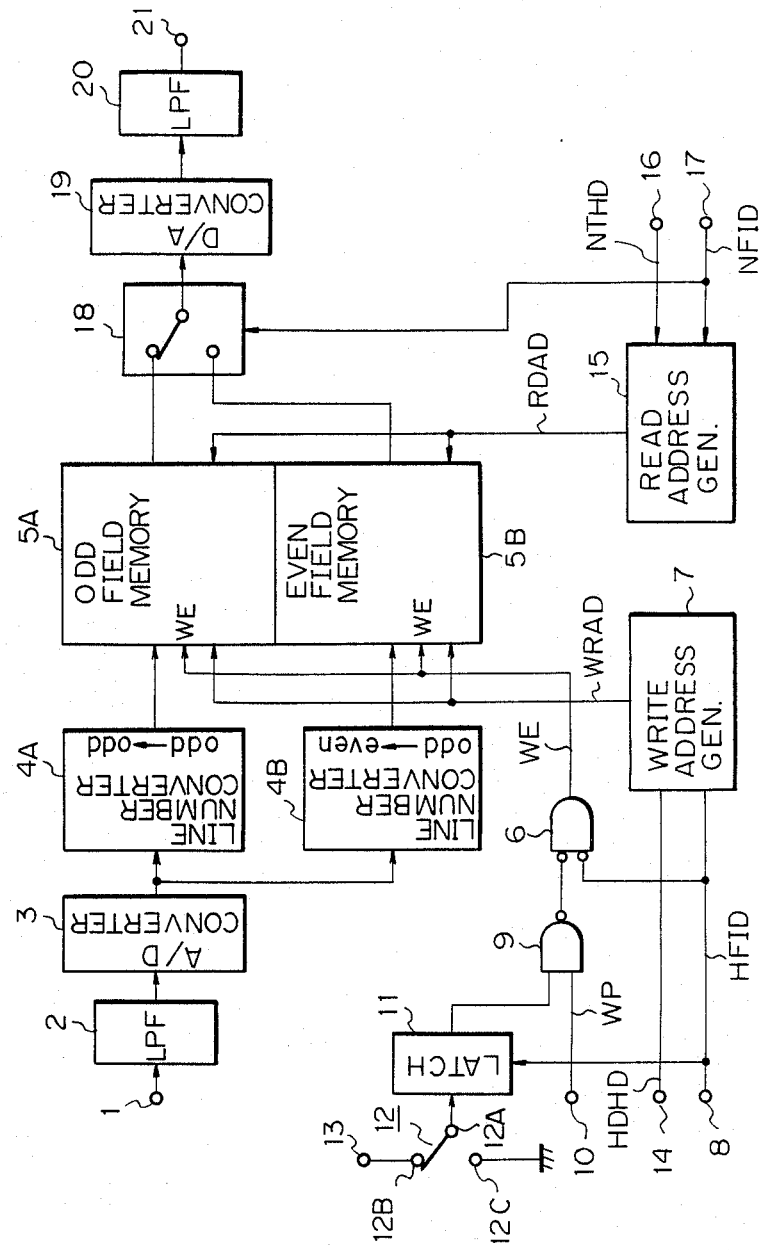
FIG. 1 is a block diagram of a standard converting apparatus according to one embodiment of the invention.

One embodiment of the invention will now be described with reference to the drawings:

In FIG. 1, an input terminal 1 receives a television signal of the HD standard which is supplied therefrom to an A/D converter 3 through a low-pass filter 2. The television signal of the HD standard is digitized at the A/D converter 3 and supplied from the latter to a line number converter 4A and a line number converter 4B.

The line number converters 4A and 4B are used for converting the lines of the HD standard into those of the NTSC standard. The line number converter 4A is constructed to develop a picture of the same field in the NTSC standard as that in the HD standard. In other words, in the line number converter 4A, a picture of an odd field in the NTSC standard is developed from that of an odd field in the HD standard, and a picture of an even field in the NTSC standard is developed from that of the odd field in the HD standard. Further, in the line number converter 4B, a picture of an even field in the NTSC standard is developed from that of the odd field in the HD standard, and a picture of an odd field in the NTSC standard is developed from that of the even field in the HD standard. Since the line number of the HD standard is equal to or larger than twice the number of lines in the NTSC standard, it is possible to form the pictures of an odd field and an even field in the NTSC standard based on data of one field in the HD standard.

More specifically, the ratio of the number of lines in the HD standard to that in the NTSC standard is 15:7 (1125:525). For this reason, by developing seven lines in the NTSC standard from fifteen lines in the HD standard using an interpolation filter, the conversion of the 1125 lines in the HD standard into the 525 lines in the NTSC standard can be attained.

Figure 2:
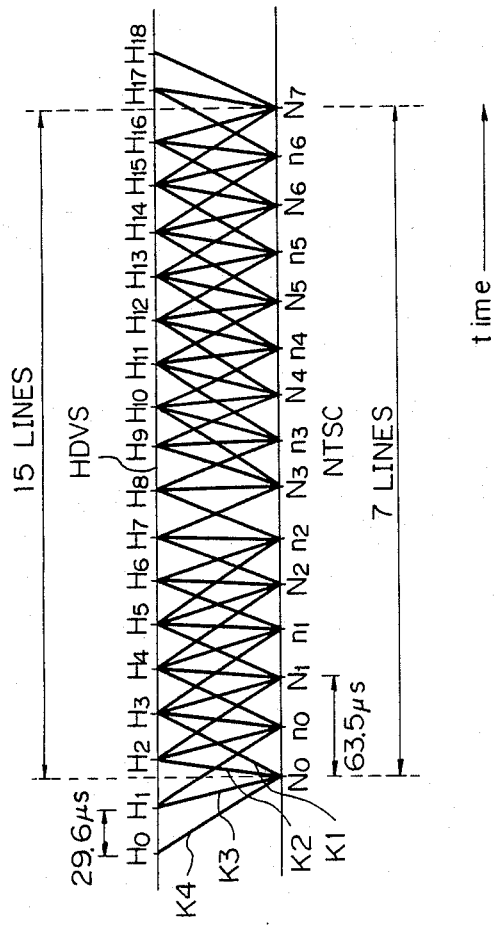
FIG. 2 is a diagram to which reference will be made in describing the operation of line number converters used in the apparatus of FIG. 1.

In FIG. 2, $H_0$, $H_1$, $H_2$, ... identifying respective lines in the HD standard, and $N_0$, $N_1$, $N_2$, ... identify respective lines in the NTSC standard. The time interval between adjacent lines in the HD standard is 29.6 $\mu$sec, whereas the time interval between adjacent lines in the NTSC standard is 63.5 $\mu$sec. The line $N_0$ in the NTSC standard is developed from the four lines close in time in the HD standard. Clearly, the development of the line $N_0$ in the NTSC standard from the four lines $H_0$, $H_1$, $H_2$ and $H_3$ in the HD standard is achieve by multiplying adequate coefficients $K_4$, $K_3$, $K_2$ and $K_1$ by the four lines $H_0$, $H_1$, $H_2$ and $H_3$, respectively, and taking the sum of those multiplied results. In a similar way, the lines $N_1$, $N_2$ and $N_3$ in the NTSC standard are respectively developed from the four lines $H_2$–$H_5$, $H_4$–$H_7$, $H_7$–$H_{10}$... which are close in time in the HD standard. As a result, the seven lines $N_1$–$N_7$ in the NTSC system are formed from among the fifteen lines $H_2$–$H_{16}$ in the HD standard.

It is to be noted that a picture of an odd field and a picture of an even field in the NTSC standard can be developed on the basis of a picture of one field in the HD standard.

Assuming now that the lines $N_1$, $N_2$, $N_3$ ... in the NTSC standard obtained in the above-mentioned manner belong to an odd field in the NTSC standard, lines $n_0$, $n_1$, $n_2$ ... of an even field in the NTSC standard are positioned between the adjacent lines $N_0$, $N_1$, $N_2$ ... of the odd field in the NTSC standard. These lines $n_0$, $n_1$, $n_2$ ... of the even field in the NTSC standard can be obtained from data of the respective lines $H_1$, $H_2$, $H_3$ ... in the HD standard. The line $n_0$ can be developed by multiplying adequate coefficients by the data of the four lines $H_1$, $H_2$, $H_3$ and $H_4$ in the HD standard close to the line $n_0$ and adding up the multiplied results. The development of the line $n_1$ can be effected by multiplying the data of the four lines $H_3$, $H_4$, $H_5$ and $H_6$ in the HD standard close to the line $n_1$ by adequate coefficients and adding the multiplied results. Similarly, the lines $n_2$, $n_3$, $n_4$ ... of the even field can be formed by multiplying the data of four lines in the HD system close to each line in the NTSC standard by adequate coefficients and adding these multiplied results.

Returning to FIG. 1, it will be seen that the outputs of the line number converters 4A and 4B are supplied to field memories 5A and 5B, respectively. A write-enable signal WE is supplied from an AND gate 6 to the field memories 5A and 5B. At a high level of the write-enable signal WE, a state is established in which a write-in operation can be performed. While the write-enable signal WE is at a high level, the outputs of the line number converters 4A and 4B are written into the field memories 5A and 5B, respectively, at addresses determined by a write address WRAD generated in a write-address generating circuit 7. A field discrimination signal HFID of the HD standard applied to a terminal 8 is fed to one inverted input terminal of the AND gate 6. The field discrimination signal HFID is at a low level in an odd field of a television signal of the HD standard and at a high level in an even field in that standard. The output of a NAND gate 9 is supplied to another inverted input of the AND gate 6. A write-in pulse WP is supplied from a terminal 10 to one input terminal of the NAND gate 9. To another input terminal of the NAND gate 9 is supplied the output of a latch circuit 11 which latches the output of a switch 12. When a terminal 12A and a terminal 12B of the switch 12 are connected, a high level signal is supplied given from a terminal 13 through the latch circuit 11 to the other input terminal of the NAND gate 9, while upon the connection of the terminal 12A and a terminal 12C of the switch 12, a low level signal is fed to the other input terminal of the NAND gate 9 via the latch circuit 11.

For writing into the field memories 5A and 5B, the terminal 12A and terminal 12B of the switch 12 are connected to apply a high level signal to the other input terminal of the NAND gate 9. When the write-in pulse WP of a high level is supplied from the terminal 10, the output of the NAND gate 9 assumes a low level. Since the output of the NAND gate 9 assumes a low level and is inverted for application to AND gate 6, the write-enable signal WE output from the AND gate 6 assumes a high level for an odd field in which the field discrimination signal HFID is kept at a low level and is inverted for application to AND gate 6.

As a result, the field memories 5A and 5B are brought into a state in which a write-in operation is possible for an odd field of a television signal in the HD standard. Data of an odd field in the NTSC standard are output from the line number converter 4A when an odd field of a television signal in the HD standard is being received. Data of an even field in the NTSC standard, which have been developed from the odd field in the HD standard, are output from the line number converter 4B when the television signal of the HD standard is in the odd field.

A horizontal synchronization signal HDHD of the HD standard and the field discrimination signal HFID of the HD standard are supplied to the write-address generating circuit 7 from a terminal 14 and the terminal 8, respectively. By the write address WRAD produced from the write-address generating circuit 7, the data of the odd field of the NTSC standard, which have been developed from the odd field of the television signal of the HD standard, are written into the field memory 5A, whereas the data of the even field in the NTSC standard, which have been developed from the odd field of the television signal of the HD standard, are written into the field memory 5B.

The outputs of the field memories 5A and 5B are read out by a read address RDAD obtained from a read-address generating circuit 15. A horizontal synchronization signal NTHD of the NTSC standard and a field discrimination signal NFID of the NTSC standard are supplied to the read-address generating circuit 15 from terminals 16 and 17, respectively.

The outputs of the field memories 5A and 5B are fed to a switch circuit 18. The field discrimination signal NFID of the NTSC standard is also supplied from the terminal 17 to the switch circuit 18 so that the switch circuit 18 may be switched or changed-over every field of the NTSC standard. The outputs of the field memories 5A and 5B are consequently alternately supplied through the switch circuit 18 to a D/A converter 19 in successive fields of the NTSC standard. Conversion of a digital signal into an analog signal is effected in a D/A converter 19, and the output of the D/A converter 19 is supplied to an output terminal 21 through a low-pass filter 20.

To reproduce a still picture, the terminals 12A and 12C of the switch 12 are connected, and the data of an odd field in the NTSC standard, which have been developed from a picture of an odd field in the HD standard, and the data of an even field in the NTSC standard, which have been developed from a picture of the odd field in the HD standard, are stored the field memories 5A and 5B, respectively. With the connection of the terminals 12A and 12C of the switch 12, the write-enable signal WE output from the AND gate 6 takes a low level. As a result, the data, which have been stored in the field memories 5A and 5B, are continuously read out to reproduce the still picture.

Figure 3A:
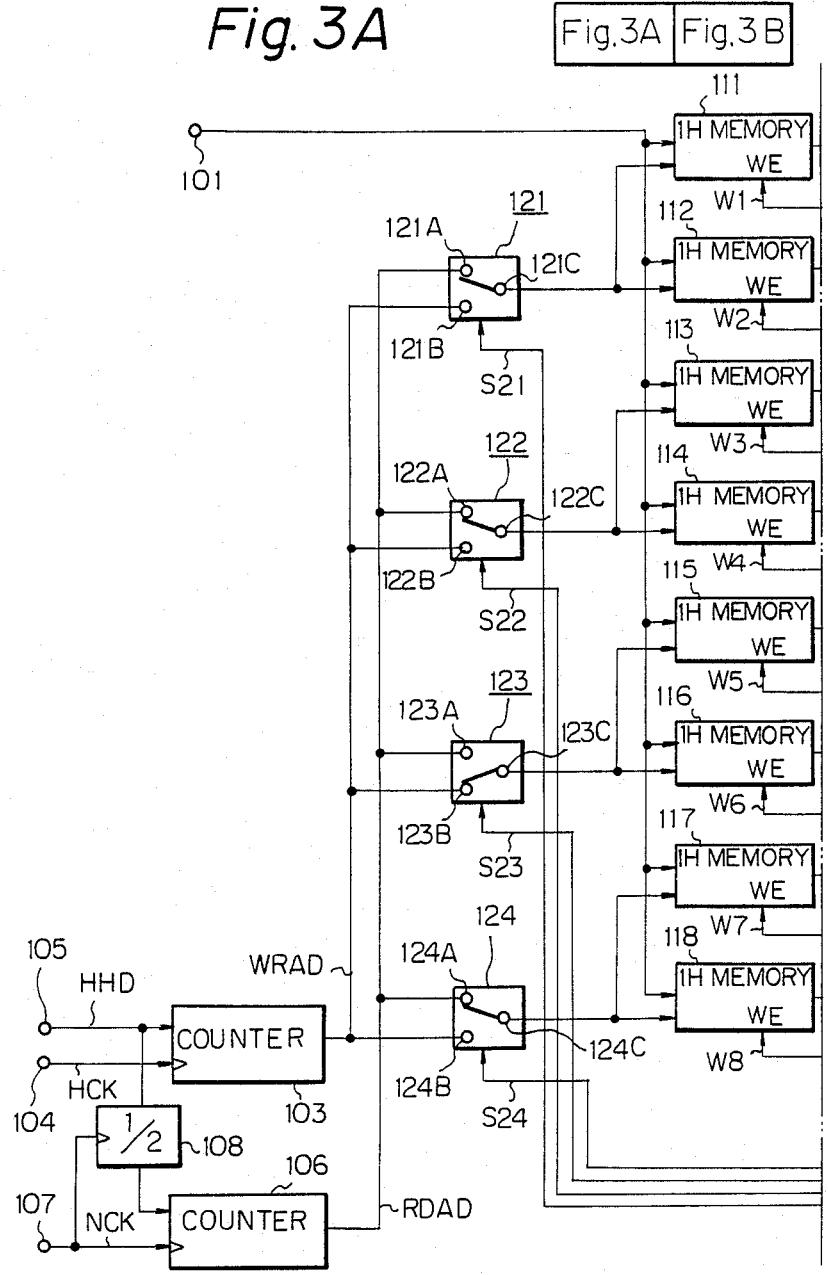
FIGS. 3A and 3B together constitute a block diagram showing an example of the line number converters.
Figure 3B:
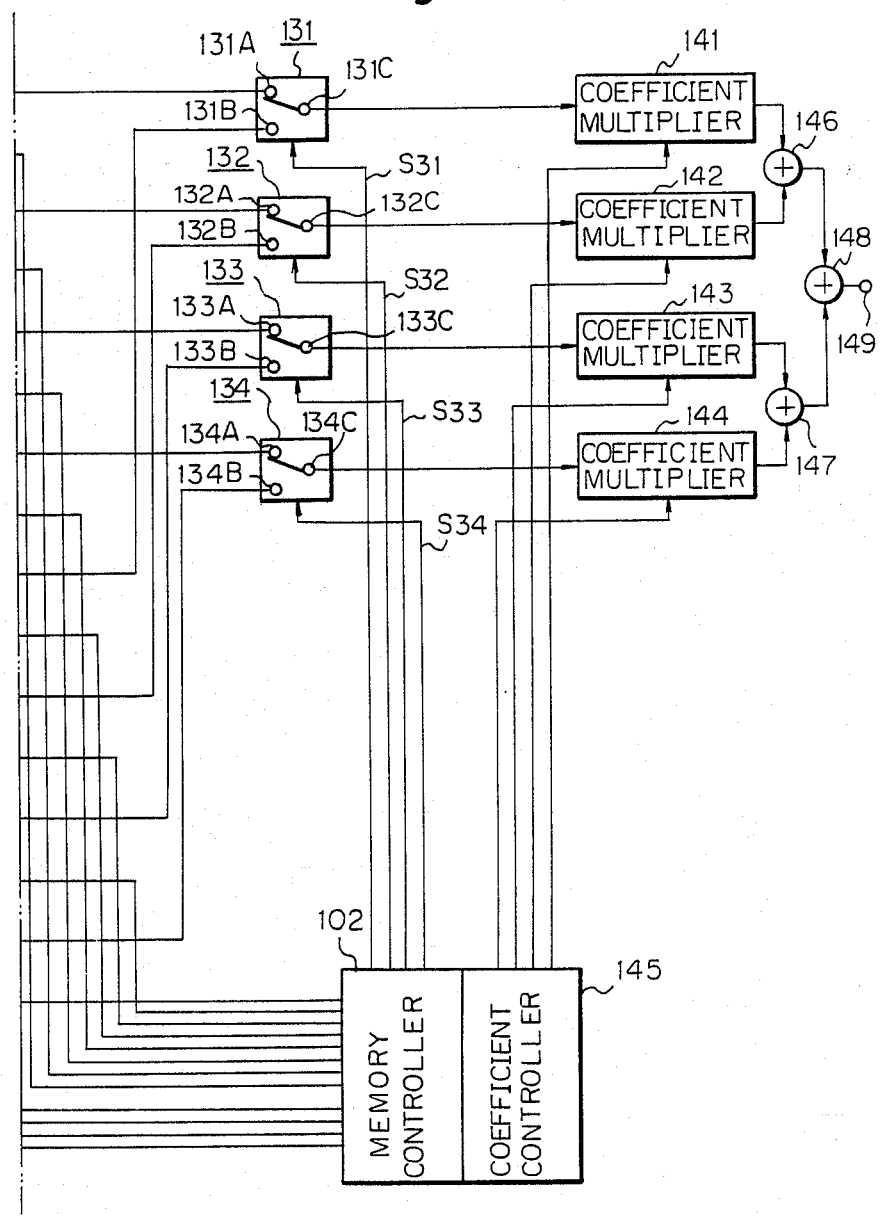

One example of the line number converters 4A and 4B will be described next with reference to FIGS. 3A and 3B which together constitute FIG. 3. In FIG. 3, a digital video signal of the HD standard is inputted to an input terminal 101. The video signal is then supplied to 1H memories 111 to 118 from the input terminal 101. To the 1H memories 111 to 118 are also supplied write-enable signals W1 to W8, respectively, as shown at F to M of FIG. 4. In response to the corresponding write-enable signals W1 to W8 having a high level, each of the memories 111 to 118 is brought into a write-enable state. A counter 103 generates a write address WRAD for the memories 111 through 118. A sampling clock HCK of the video signal in the HD standard is supplied through a terminal 104 to a clock input terminal of the counter 103. Data of the counter 103 are incremented by the sampling clock HCK. A synchronization signal HHD of the video signal of the HD standard is fed from a terminal 105 to a reset terminal of the counter 103 so as to reset the counter 103. The write address WRAD generated from the counter 103 is incremented every synchronization interval of the video signal of the HD standard by the sampling clock HCK of the video signal in the HD standard.

A counter 106 generates a read address RDAD for the memories 111 to 118. To a clock input terminal of the counter 106 is supplied a sampling clock NCK of a video signal of the NTSC standard from a terminal 107. The NCK clock may have a frequency of 4fsc (where fsc is a color subcarrier frequency), for instance. Data of the counter 106 are incremented by the sampling clock NCK of the video signal in the NTSC standard. The synchronization signal HHD of the video signal of the HD standard is given to a reset terminal of the counter 106 through a ½ demultiplier or divider 108. The sampling clock NCK of the video signal in the NTSC standard is fed to the ½ divider 108 so that the synchronization signal HHD given via the ½ demultiplier 108 and said sampling clock NCK are synchronized. The data of the counter 106 are reset with the synchronization HHD of the video signal in the HD standard supplied through the ½ divider 108. As a result, the read address RDAD is incremented by the sampling clock NCK of the video signal of the NTSC standard at every two lines of the video signal of the HD standard.

The write address WRAD generated by the counter 103 and the read address RDAD generated by the counter 106 are supplied to the memories 111 to 118 through switch circuits 121 to 124. Switch control signals S21 to S24 are provided from a memory controller 102 (FIG. 3B) to the switch circuits 121 to 124 as shown at B to E of FIG. 4. The switch circuits 121 to 124 are controlled by the switch control signals S21 to S24, respectively. As a result, the write address WRAD and the read address RDAD are selectively supplied to the memories 111 and 112, the memories 113 and 114, the memories 115 and 116, and the memories 117 and 118, respectively.

The outputs of the memories 111 to 114 are supplied to first input terminals 131A to 134A of switch circuits 131 to 134, respectively, while the outputs of the memories 115 to 118 are fed to the other or second input terminals 131B to 134B of the switch circuits 131 to 134, respectively. To the switch circuits 131 to 134 are supplied switch control signals S31 to S34 from the memory controller 102 as shown at O to R of FIG. 4, respectively. The outputs of the memories 111 to 114, or the outputs of the memories 115 to 118 are selected by the switch circuits 131 to 134 to be given to coefficient multipliers 141 to 144, respectively. Predetermined coefficients depending on the outputs of the memories 111 to 118, which have been selected by the switch circuits 131 to 134, are provided from a coefficient controller 145 to the coefficient multipliers 141 to 144, and multiplied therein by the outputs of the switch circuits 131 to 134, respectively.

The outputs of the multipliers 141 and 142 are supplied to an adder 146, and the outputs of the multipliers 143 and 144 are supplied to an adder 147. The outputs of the adders 146 and 147 are supplied to an adder 148 and the output of the latter is provided to an output terminal 149.

The operation of the line number converters 4A and 4B will be described referring to FIGS. 3 to 5.

Figure 4:
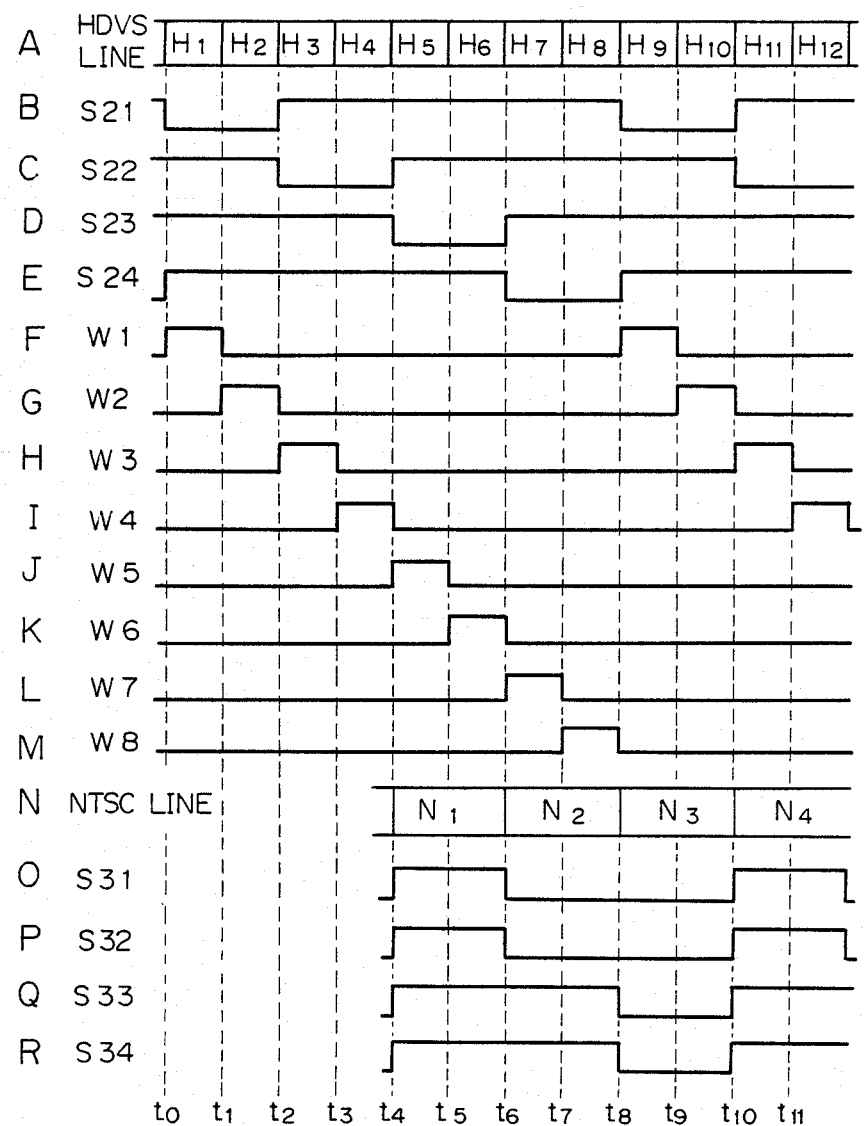
FIGS. 4 and 5 are timing charts to which reference will be made in describing the operation of the line number converters.
Figure 5:
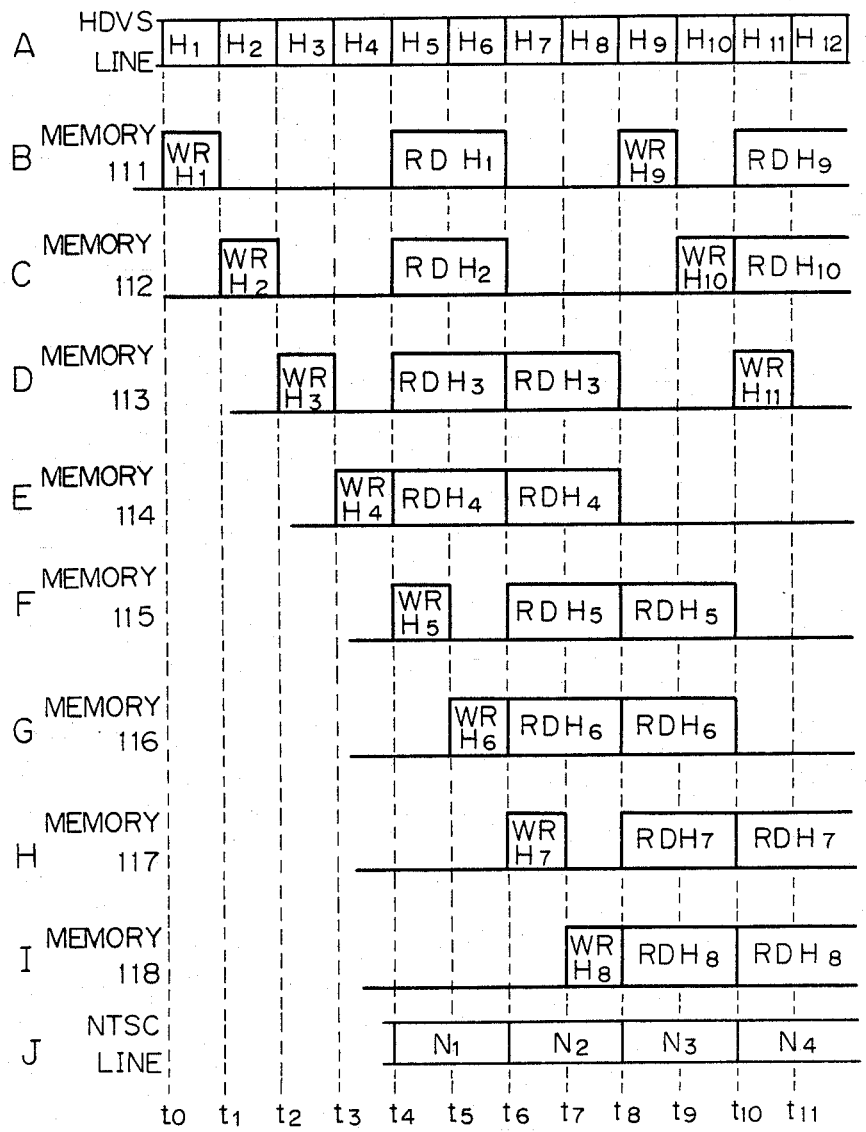

FIG. 4 shows the states of the switch control signals S21 to S24 at lines B to E, the write-enable signals W1 to W8 at lines F to M, and the switch control signals S31 to S34 at lines O to R in each of lines $H_1$, $H_2$, $H_3$, ... of a video signal of the HD standard. Also, the operation states of the memories 111 to 118 in each of the lines $H_1$, $H_2$, $H_3$, ... are shown at lines B to J of FIG. 5.

At time $t_0$ to $t_2$, the switch control signal S21 takes is at a low level, and the switch control signals S22, S23 and S24 assume a high level as shown at B to E of FIG. 4. For this reason, in the switch circuits 121 to 124, an output terminal 121C of the switch circuit 121 is connected to an input terminal 121B, and output terminals 122C, 123C and 124C of the switch circuits 122, 123 and 124 are connected to input terminals 122A, 123A and 124A, respectively. As a result, the write address WRAD is supplied to the memories 111 and 112 from the counter 103, while the read address RDAD is supplied from the counter 106 to the memories 113 and 114, the memories 115 and 116, and the memories 117 and 118.

On the other hand, to the memories 111 to 118 are supplied the write-enable signals W1 to W8 as indicated at F to M of FIG. 4. At the time $t_0$ to $t_1$, the write-enable signal W1 is at a high level, and the write-enable signal W2 is at a high level at the time $t_1$ to $t_2$. The memory 111 is brought into a write-enable state at the time $t_0$ to $t_1$, and at the time $t_1$ to $t_2$ the memory 112 assumes a write-enable state. Consequently, as indicated at B of FIG. 5, the video signal of the line $H_1$ of the HD standard is written into the memory 111 by the write address WRAD at the time $t_0$ to $t_1$, while at the time $t_1$ to $t_2$, the video signal of the line $H_2$ of the HD standard is written into the memory 112 by the write address WRAD.

At the time $t_2$ to $t_4$, the switch control signal S22 is at a low level, and the switch control signals S21, S23 and S24 assume a high level. At the time $t_2$ to $t_3$, the write-enable signal W3 is at a high level, and the write-enable signal W4 assumes a high level at the time $t_3$ to $t_4$. Accordingly, as indicated at D and E of FIG. 5, the video signal of the line $H_3$ of the HD standard is written into the memory 113 by the write address WRAD at the time $t_2$ to $t_3$, while at the time $t_3$ to $t_4$, the video signal of the line $H_4$ of the HD standard is written into the memory 114 by the write address WRAD.

At the time $t_4$ to $t_6$, the switch control signal S23 is at a low level, whereas the switch control signals S21, S22 and S24 assume a high level. At the time $t_4$ to $t_5$ the write-enable signal W5 is at a high level, and the write-enable signal W6 is at a high level at the time $t_5$ to $t_6$. As a result, as indicated at F and G of FIG. 5, the video signal of the line $H_5$ of the HD standard is written into the memory 115 by the write address WRAD at the time $t_4$ to $t_5$, and the video signal of the line $H_6$ of the HD standard is written into the memory 116 by the write address WRAD at the time $t_5$ to $t_6$.

Also, since at the time $t_4$ to $t_6$ the switch control signal S21, S22 and S4 are at a high level and since the terminals 121A, 122A and 124A of the switch circuits 121, 122 and 124 are connected to the terminals 121C, 122C and 124C, respectively, the read address RDAD is supplied to the memories 111 and 112, the memories 113 and 114 and the memories 117 and 118. The switch control signals S31 to S34 are then brought to a high level as shown at O to R of FIG. 4 so that the terminals 131A, 132A, 133A and 134A of the switch circuits 131, 132, 133 and 134 are connected to the terminals 131C, 132C, 133C and 134C, respectively. For this reason, the video signals of the lines $H_1$, $H_2$, $H_3$ and $H_4$ of the HD standard, which have been written into the memories 111 to 114, are read out by the read address RDAD as indicated at B to E of FIG. 5, and supplied to the coefficient multipliers 141, 142, 143 and 144, respectively. Those video signals of the lines $H_1$ to $H_4$ of the HD standard are consequently multiplied by adequate coefficients from controller 145, summed up by adders 146–148 and delivered at output terminal 149 as a video signal of the line $N_1$ in the NTSC standard.

As mentioned above, the read address RDAD for the memories 111 to 118 is incremented with the sampling clock NCK of a video signal in the NTSC standard. Therefore, the video signal of each line in the NTSC standard to be delivered at the output terminal 149 is used for the sampling frequency of the video signal in the NTSC standard.

At the time $t_6$ to $t_8$, the switch control signal 24 is at a low level, whereas the switch control signals S21, S22 and S23 have a high level. At the time $t_6$ to $t_7$, the write-enable signal W7 assumes a high level, while at the time $t_7$ to $t_8$ the write-enable signal W8 is at a high level. As a result, the video signal of the line $H_7$ of the HD standard is written into the memory 117 by the write address WRAD at te time $t_6$ to $t_7$, and the video signal of the line $H_8$ of the HD standard is written into the memory 118 by the write address WRAD at the time $t_7$ to $t_8$.

In addition, at the time $t_6$ to $t_7$, the read address RDAD is supplied to the memories 111 and 112, the memories 113 and 114 and the memories 115 and 116. As shown at O to R of FIG. 4, the switch control signals S31 and S32 are brought to a low level, whereas the switch control signals S33 and S34 are brought to a high level. Consequently, the terminals 131B and 132B of the switch circuits 131 and 132 are connected to the terminals 131C and 132C, respectively, and the terminals 133A and 134A of the switch circuits 133 and 134 are connected to the terminals 133C and 134C, respectively. As a result, the video signals of the lines $H_3$, $H_4$, $H_5$ and $H_6$ in the HD standard, which have been written into the memories 113 to 116 as shown at D to G of FIG. 5, are read out by the read address RDAD, and supplied to the coefficient multipliers 141, 142, 143 and 144. The coefficients for the multipliers 141 to 144 are optimally set every line by controller 145. Thus, the video signal of a line $N_2$ of the NTSC standard, which is formed of the video signals of the lines $H_3$ to $H_6$ in the NTSC standard, is output from the output terminal 149.

At the time $t_6$ to $t_8$, the video signals of the lines $H_1$ to $H_6$ in the HD standard have been written into the memories 111 to 116. Therefore, at the time $t_6$ to $t_8$, it is possible to develop one line of the NTSC standard from the lines $H_1$ to $H_4$ by connecting the terminals 131A, 132A, 133A and 134A of the switch circuits 131 to 134 to the terminals 131C, 132C, 133C and 134C, respectively. Also, by the connection of the terminals 131A, 132A, 133A and 134A of the switch circuits 131 to 134 to the terminals 131C, 132C, 133C and 134C, one line of the NTSC standard can be developed out of the lines $H_2$ to $H_5$.

Similarly, at the time $t_8$ to $t_9$, the video signal of the line $H_9$ in the HD standard is written into the memory 111, and at time $t_9$ to $t_{10}$ the video signal of the line $H_{10}$ is written into the memory 112. At this time, the video signals of the lines $H_5$ to $H_8$ in the HD standard are read out from the memories 115 to 118 and supplied to the coefficient multipliers 141 to 144, respectively. Consequently, the video signal of a line $N_3$ of the NTSC standard, which is formed of the lines $H_5$ to $H_8$ in the HD standard is produced from the output terminal 149. The ratio between the number of lines of a video signal of the HD standard and that of a video signal of the NTSC standard is (15:7) that is, slightly greaer than (2:1). For this reason, one line of the video signal in the NTSC standard can be formed for the two-line duration of the video signal of the HD standard. In this example, the video signal of one line of the HD standard is written into the memories 111 to 118 by the write address WRAD, which is incremented with the sampling clock for the video signal of the HD standard. The video signal of one line written in the memories 111 to 118 is read out for the two-line duration by the read address RDAD, which is incremented with the sampling clock for the video signal of the NTSC standard. The two-line duration of the video signal of the HD standard is (29.6 $\mu sec \times 2 = 59.2$ $\mu sec$). For this reason, and assuming that the sampling frequency of the video signal of the NTSC standard is 4 fsc, the clock period becomes 70 nsec to enable 848 samples to be read. As a result, more than 760 samples, which is the effective sample number of the video signal in the NTSC standard, can be obtained.

In this manner, the line number conversion for dividing the number of lines by 2 can be effected by reading out one line of the video signal of the HD standard for the two-line duration of the HD standard. By thinning out unnecessary outputs among the outputs converted to ½ the original line number, the line number conversion for converting the line number to 7/15 the original line number can be attained. It is to be noted that the outputs do not become continuous. For this reason, it is required that the thinned-out outputs are once stored in the frame memory and rearranged to be continuous data.

Next, another example of the line number converters will be described.

Instead of the switch circuits 121 to 124 for selecting the read address RDAD and the write address WRAD for the memories 111 to 118, eight switch circuits could be provided for the eight memories 111 to 118. In the illustrated embodiment, the read address RDAD and the write address WRAD are commonly supplied to the memories 111 and 112, the memories 113 and 114, the memories 115 and 116 and the memories 117 and 118 into which video signals of adjacent lines are written. As a result, the switch circuits are reduced to the four switch circuits 121 to 124 to achieve the miniaturization of hardware employed for selecting one of the read address RDAD and the write address WRAD suplied to the memories 11 to 118. The foregoing is possible since the reading operation is simultaneously performed for adjacent lines for the two-line duration of the video signal of the HD standard, so that the read address RDAD can be commonly supplied to the 1H memories in which the adjacent-line video signals are written. At the time of writing, the control can be performed so that the write-in operation is carried out for one-sided 1H memories by the write-enable signals W1 to W8.

Similarly, instead of the switch circuits 131 to 134 for selecting the outputs read out of the memories 111 to 118, eight switch circuits may be provided for those memories. However, in the described embodiment, by selecting the outputs of the memories 111 and 115, the memories 112 and 116, the memories 113 and 117, and the memories 114 and 118 in which video signals of lines distant from each other are written, by the use of the switch circuits 131, 132, 133 and 134, the outputs of continuous lines are obtained from the four switch circuits 131 to 134. This achieves the further reduction of the number of the switch circuits used to simplify the whole hardware.

In the above-mentioned described embodiment, the odd field and the even field of the NTSC standard are developed from an odd field of the HD standard and stored in the field memories 5A and 5B. However, the odd and even fields of the NTSC standard may be developed from an even field of the HD standard and stored the field memories 5A and 5B.

Furthermore, although the conversion of a television signal of the NTSC standard into that of the HD standard has been specifically described, the invention can be applied similarly to the case of the conversion of a television signal of the PAL standard into that of the HD standard.

Generally, according to the invention, a picture of an odd field and a picture of an even field in the NTSC standard are developed from, for example, an odd field in the HD standard and read out consecutively to reproduce a still picture. In this way, since the still picture is reproduced using one frame data of an odd field and an even field in the NTSC standard, a distinct picture can be reproduced. Also, because the odd and even fields of the NTSC standard are developed from one field of the HD standard, double images are not reproduced even if picture movement occurs.

What is claimed is:

1. A standard converting apparatus for converting a video signal according to a first television standard into a video signal according to a second television standard, said converting apparatus comprising:

first line number converting means supplied with the video signal for one field according to said first television standard and for generating therefrom the video signal of an odd field according to said second television standard;

second line number converting means supplied with the video signal for said one field according to the first television standard and for generating therefrom the video signal of an even field according to said second television standard;

first memory means for storing an output of said first line number converting means;

second memory means for storing an output of said second line number converting means; and memory control means for controlling write and read operations of said first and second memory means so that the video signals stored in said first and second memory means are consecutively read out.

2. A standard converting apparatus as claimed in claim 1, wherein said memory control means includes write address generating means controlled by a synchronizing signal and a field identifying signal of said video signal according to said first television standard, and read address generating means controlled by the synchronizing signal and a field identifying signal of the video signal according to said second television standard.

3. A standard converting apparatus as claimed in claim 1, wherein each of said first and second line number converting means includes an interpolating filter having plural delay circuits for delaying a given signal for one line duration of said first television standard.

4. A standard converting apparatus as claimed in claim 1, wherein said memory control means includes write-enable signal generating means for generating a write-enable signal supplied to write-enable terminals of said first and second memory means.

5. A standard converting apparatus as claimed in claim 1, wherein said memory control means includes selecting means for selecting one of the outputs read out from said first and second memory means.

6. A standard converting apparatus as claimed in claim 1, wherein the number of lines within one field of said first television standard is more than twice the number of lines within one field of said second television standard.

7. A standard converting apparatus as claimed in claim 6, wherein said first television standard is the high definition television standard and said second television standard is NTSC.

* * * * *

UNITED STATES PATENT AND TRADEMARK OFFICE
CERTIFICATE OF CORRECTION

PATENT NO. : 4,751,573
DATED : June 14, 1988
INVENTOR(S) : Tatsuya Kubota

It is certified that error appears in the above-identified patent and that said Letters Patent is hereby corrected as shown below:

Column 2, line 60 change "identifying" to --identify--.
Column 4, line 58, after "stored" insert --in--.
Column 6, line 20, delete "takes".
Column 7, line 37, change "te" to --the--.
Column 8, line 17, change "greaer" to --greater--.
Column 9, line 17, delete "mentioned";
    line 23, after "stored" insert --in--.

IN CLAIMS

Column 10, line 21, change "the" to --a--.

Signed and Sealed this

Fourteenth Day of February, 1989

*Attest:*

DONALD J. QUIGG

*Attesting Officer*          *Commissioner of Patents and Trademarks*